(12) United States Patent
Chen (10) Patent No.: US 9,920,803 B2
(45) Date of Patent: Mar. 20, 2018

(54) SINGLE-SIDE DOUBLE-INCLINED-SURFACE DISC-TYPE BRAKE

(71) Applicant: Chengdu ShuangChen Technology Co., Ltd, Chengdu (CN)

(72) Inventor: Kun Chen, Chengdu (CN)

(73) Assignee: Chengdu ShuangChen Technology Co., Ltd., Chengdu (CN)

( * ) Notice: Subject to any disclaimer, the term of this patent is extended or adjusted under 35 U.S.C. 154(b) by 0 days.

(21) Appl. No.: 15/026,295

(22) PCT Filed: Oct. 21, 2014

(86) PCT No.: PCT/CN2014/089043
§ 371 (c)(1),
(2) Date: Mar. 31, 2016

(87) PCT Pub. No.: WO2015/058673
PCT Pub. Date: Apr. 30, 2015

(65) Prior Publication Data
US 2016/0238097 A1    Aug. 18, 2016

(30) Foreign Application Priority Data

Oct. 26, 2013 (CN) .......................... 2013 1 0534271

(51) Int. Cl.
*F16D 55/08* (2006.01)
*F16D 65/18* (2006.01)
(Continued)

(52) U.S. Cl.
CPC ........... *F16D 65/18* (2013.01); *F16D 55/225* (2013.01); *F16D 55/48* (2013.01); *F16D 2121/24* (2013.01); *F16D 2125/66* (2013.01)

(58) Field of Classification Search
CPC .... F16D 65/18; F16D 55/225; F16D 2125/66; F16D 55/48; F16D 2121/24
(Continued)

(56) References Cited

U.S. PATENT DOCUMENTS 3,797,614 A * 3/1974 McCay, Jr. ............. F16D 67/00
188/134
6,079,537 A * 6/2000 Hofmann ............ E04F 11/1812
192/109 R
(Continued)

FOREIGN PATENT DOCUMENTS

CN     101876357 A    11/2010
CN     102537140 A    7/2012
(Continued)

OTHER PUBLICATIONS

International Publication for PCT/CN2014/089043, Document dated Oct. 21, 2014.
(Continued)

*Primary Examiner* — Pamela Rodriguez
(74) *Attorney, Agent, or Firm* — Wayne & King LLC (57) ABSTRACT

The invention relates to a disc-type brake which can use the energy of a transport machine during its traveling to brake, has a huge self-energizing action and is used for a motorcycle, a car, a truck, a train and an elevator. The brake has a very small control force (power), is simple and reliable and has a small volume. The brake is very easily designed as an electrically controlled disc-type brake system (EMB), the power and volume of an electrically controlled motor of the brake can be several times—more than a dozen of times less than that of an electrically controlled motor in the prior art, after its promotion, the brake can greatly improve the safety of the car and the motorcycle. The brake can reduce many parts, components and mechanisms and save much cost and
(Continued)

bring us tremendous social and economic benefits and is a landmark brake.

6 Claims, 6 Drawing Sheets

(51) Int. Cl.
*F16D 55/48* (2006.01)
*F16D 55/225* (2006.01)
*F16D 121/24* (2012.01)
*F16D 125/66* (2012.01)

(58) Field of Classification Search
USPC .......... 303/195; 188/72.7, 72.1, 73.1, 134; 192/109 R, 111.1, 70.251, 70.252
See application file for complete search history.

(56) References Cited

U.S. PATENT DOCUMENTS

2004/0011603 A1\* 1/2004 Yokoyama ............ B60T 13/741
 188/72.7
2007/0108010 A1 5/2007 Naude

FOREIGN PATENT DOCUMENTS

CN 102996684 A 3/2013
DE 102011106001 A 1/2012
GB 2294983 A 5/1996

OTHER PUBLICATIONS

International Search Report for PCT/CN2014/089043, Document dated Mar. 31, 2016.

\* cited by examiner

SINGLE-SIDE DOUBLE-INCLINED-SURFACE DISC-TYPE BRAKE

FIELD OF THE INVENTION

The invention relates to a disc brake in the fields of traffic and transport machinery, such as a car, a motorcycle, a train, and an elevator.

BACKGROUND

Patent Application No. 201110291009.9, titled self-energizing disc brake, discloses a brake which solves a problem that the disc brake has no self-energizing effect, especially the big problem to control the self-energizing disc brake. It also solves the problem of the small self-energizing range of the self-energizing ratio (generally, it is only 1-4) of the brake. The self-energizing ratio (Efficiency Factor) can be increased by one times—dozens of times or even more. This greatly expands the use range of the disc brake. However, such self-energizing disc brake needs inclined surfaces to be arranged at two sides of the brake disc, thereby causing the disadvantages of bigger size, complicated structure and too many sealing parts.

The disc brake on the car greatly improves the safety of the car. However, the disc brake has small braking force (low efficiency factor) and no self-energizing effect. It requires power assistance (a vacuum booster for a gasoline car) to brake the car, and is difficult to arrange a parking brake and an emergency brake. It is high cost, and the braking force will be very small after the engine is off, especially after the car has an accident flameout. Since the disc brake uses the hydraulic drive, it has a security risk of being lag which may fail to meet the security requirement. Accordingly, in order to ensure that the car has a big enough braking force at any time, the idle speed of the engine shall be adjusted to be a relatively high level, as the vacuum booster needs bigger vacuum to produce an assistant force. In this case, the car needs more fuel when the driver waits for traffic lights and during traffic jams, which is not good for the economy and the environment. In addition, when the brake is used in a diesel car, a double energy car and an electrical car, it needs to be provided additionally with a vacuum pump, which would significantly increase the costs. The common disc brake in the prior art also cost much when being provided as a parking brake.

In order that the disc brake can have self-energizing effect, people have carried out a lot of exploration. "Brake Technology Handbook" (Germany, B. Breuilh K. Bill, Machinery Industry Press, published in June, 2011, ISBN 978-7-111-34916-7, Page 359-Page 363) disclosed two electrically controlled disc brakes which are under experiment and promising, in which a method of single inclined-surface servo (wedge servo) is adopted. The braking is carried out by a motor via a transmission mechanism under the control of CPU (a computer). So far the disclosed electrically controlled disc brake cannot be exactly controlled. Another method used therein needs a high powered and big-sized motor which consumes lots of electricity that the power source can hardly supply. Additionally, the big size of the motor makes itself hard to be mounted by the wheel. Furthermore, the high cost of the high-powered and big-sized motor affects its implementation.

The invention provides a series of solutions related to a high self-energizing servo disc brake aiming at solving the following problems: as the common disc brake has a low efficiency factor, a power booster may be necessary; it is difficult to control the disc brake as the control force (power) is large; it may cost a lot to provide a parking brake with the disc brake; and other economic, security and environment problems caused by the high idle speed of the engine. This disclosure also solves the problem that it is difficult to control the self-energizing effect of the disc brake in the prior art. Furthermore, this disclosure can also compensate for the deformation of a machine body (a clamp body) of the brake produced when the braking is carried out, so as to reduce the operation stroke and increase the energizing ratio of the brake. When the braking force of a single-side double-inclined-surface disc brake is the same as that of the disc brake in the prior art, and their operation strokes are also the same, the operation force (the control force and the control power) of the brake of the invention can be several times or even dozens of times less than that of the brake in the prior art. Furthermore, the force therebetween is in linear relation. Therefore, the brake of the present invention can be very conveniently controlled. For example, an electrical servo mechanism (e.g. the motor) or the like may be used to carry out electrical control to realize EMB. However, the motor of the disc brake which carries out electrical control (EMB) in the prior art has very high power, big size and huge electric energy consumption, thereby affecting its use and promotion. The disc brake of this disclosure can directly carry out electrical control, and ABS, ASR, ESP, EBV, ECD and HDC can be directly controlled by CPU (computer). Therefore, the invention does not need a lot of hydraulic and mechanical mechanisms any more, reducing manufacture cost, improving reliability, and reducing hysteresis and improve security. It also solves the problems in the self-energizing disc brake in Patent Application No. 201110291009.9, in which both sides of the brake disc need an inclined surface, resulting in the complicated structure, the low stiffness of the jaw, too many parts to be sealed, and the troubles of sealings.

SUMMARY OF THE INVENTION

A brake sheet (also known as a brake shoe), a brake disc, a slide pin and a fixing bracket of a single-side double-inclined-surface disc brake of the invention are the same as those of the common disc brake in the prior art. The brake of the invention comprises a brake disc, a machine body movably connected to a frame, two brake shoes, one of which is mounted onto the machine body and the other is positioned at one side of the brake disc; a drive device and a compensation device; wherein the brake shoe positioned at one side of the brake disc is mounted onto one side of an energizing inclined board; a first self-energizing inclined surface on the other side of the energizing inclined board is abutted against a second self-energizing inclined surface on one side of a control inclined board, such that the energizing board is driven by the control inclined board; wherein the control inclined board further comprises a first control inclined surface and a second control inclined surface on the other side opposite to the second self-energizing inclined surface of the control inclined board; wherein the compensation device comprises a compensation board having a first compensation inclined surface and a second compensation inclined surface; wherein the first control inclined surface is abutted against the first compensation inclined surface and the second control inclined surface is abutted against the second compensation inclined surface; the control inclined board is further abutted against a retaining device; the retaining device is connected with a control device.

Furthermore, the retaining device is selected from the group consisting of means, mechanisms, devices, or components with high frontward transmission efficiency and low backward transmission efficiency; wherein one or more retaining devices are used; wherein the control device comprises a handle, a hydraulic system, an electrical system, a motor and a pneumatic system.

Furthermore, the retaining device is selected from the group consisting of threads, inclined surfaces, cams, worm-and-gear, connecting rods and wedges.

Furthermore, the first self-energizing inclined surface, the second and the first self-energizing inclined surfaces, the second-energizing inclined surface, the first control inclined surface, the second control inclined surface, the first compensation inclined surface and the second compensation inclined surface each comprises a configuration selected from the group consisting of an arc, a hyperbolic curve and parabola; wherein the first and second self-energizing inclined surfaces, the first and second control inclined surfaces, the first and second compensation inclined surfaces each is formed by a plurality of sub-inclined surfaces, a plurality of curved surfaces, or the combination thereof.

Furthermore, a rolling body provided between the first self-energizing inclined surface and the second self-energizing inclined surface between the first control inclined surface and the first compensation inclined surface, or between the second control inclined surface and the second compensation inclined surface is selected from the group consisting of a rolling needle, a cylindrical roller or a steel ball.

Furthermore, one side of the compensation board is moveably connected to the frame, and the other side of the compensation board is connected to two compensation screws by means of the rolling body; wherein the two compensation screws are engaged with the machine body with a threaded connection; wherein two torsional springs are connected to the two compensation screws and the machine body and therefore provide torsion for the two compensation screws; wherein a friction limiting shaft is movably connected to the energizing inclined board, the compensation board and the machine body; wherein a thread hold provided on an inclined surface shaft is engaged with a shaft on the motor; wherein a inclined surface on the inclined surface shaft is movably connected to the control inclined board.

A single-side double-inclined-surface disc brake is provided which has the better performance of the common disc brake in the prior art without having the disadvantages of heat recession and water recession. As the brake has a high self-energizing capacity and the advantages of a drum-type brake, the energizing effect of the present invention can be much higher than that of the drum-type brake, and can be self-energized by one times—dozens of times (efficiency factor). It does not have the problems existing in the common disc brake, for example, the small braking force (low efficiency factor), an additional power booster (for a car) being required, difficult to arrange the parking braking thereon, the unstable security and the high cost. Furthermore, if the parking is arranged thereon, it does not increase the cost, thus saving much cost, particularly a diesel car, a new energy car (for example, an electric and dual-fuel car), which use the brake of the invention, can save more than 30% of cost than that of a brake system in the prior art. A power boosting system is not used on the car, an engine does not need to provide enough vacuum to the power boosting system, the idle rotation speed of the engine is only used to maintain its normal rotation, therefore, the idle rotation speed can be reduced greatly, much fuel and money can be saved particularly during traffic jams and at traffic lights, thus saving energy and reducing pollution. It does not use the power boosting system, thereby reducing the chance of a failure and greatly improving security. Particularly, it has very high self-energizing, is very easily controlled, and is easily taken as an electrically controlled disc brake system (EMB). It can hence save a lot of hydraulic mechanisms, mechanical mechanisms and electronic control mechanisms, and is directly controlled by CPU (a computer) of a car. Therefore, it has the advantages of a simple structure, a low cost and a fast braking response, thereby greatly improving the security of the brake system. This is exactly the difficult problem which the automotive circle eagerly want to but fail to resolve. It can also compensate for the deformation of a machine body (a clamp body) of the brake produced when the braking is carried out, to reduce an operation stroke and increase the energizing ratio of the brake. Therefore, a control force is reduced and a braking force is increased. As the brake can produce very much positive pressure, the requirement for a brake shoe can be lowered greatly, particularly as its friction factor (coefficient of friction) can be reduced from 0.4 to 0.05, its selection range can be expanded by many times, and a material of the brake shoe can hence be very easily selected. Therefore, the brake of the invention is a new generation of a brake which combines the advantages of the common disc brake and the drum-type brake and has better performance, security, cost, energy-saving and environment protection.

BRIEF DESCRIPTION OF DRAWINGS

In FIG. 1, the direction labeled with V is the direction of the rotation direction of the brake disc (similarly hereinafter).

The parts represented by reference numbers in figures are as follows: 1: Machine Body; 2: Brake Shoe; 3: Brake Disc; 4: Bracket 5: Energizing Inclined Board; 6: Parking Braking Pulling-Rope Hook; 7: Control Inclined Board; 8: Compensation Board; 9: Self-Compensation Clamping Bolt; 10: Friction Limiting Shaft; 11: Torsional Spring; 12: Key; 13: Motor; 14: Inclined Surface Shaft; 15: Compensation Screw; 16: Return Spring; 17: Steel Ball; 18: Control Working Inclined Surface; 19: Energizing Working Inclined Surface 20: Inclined Surface; 21: Electromagnet; 22: Limiting Overrunning Clutch; 23: Rod; 24: Inclined Groove Rod; 25: Pin; 26: Roller; 27: Steel Wire Rope.

DETAILED DESCRIPTION OF THE INVENTION

Figure 1:
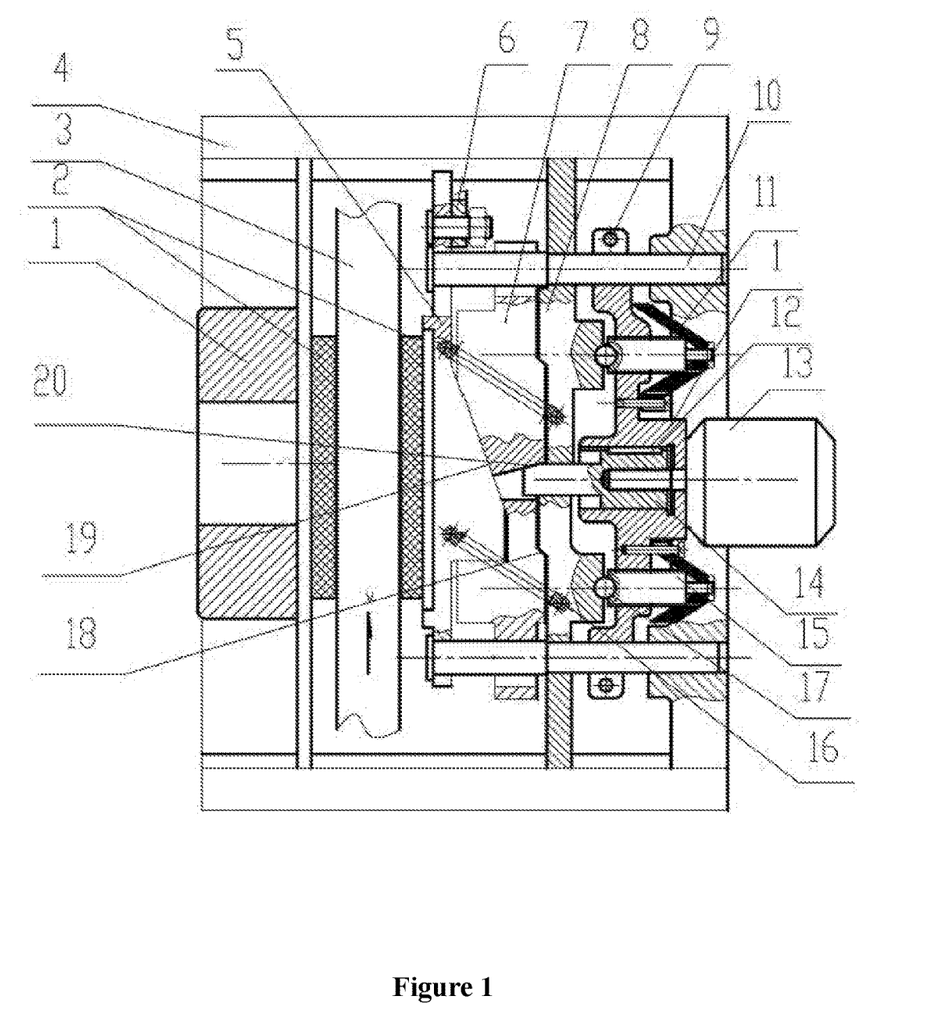
FIG. 1 is a cross section view of a float-caliper single-side double-inclined-surface disc brake used in cars and electric cars according to one embodiment of the present invention. The brake has two retaining configurations, one being an inclined surface and the other a thread, so that the brake has a very high energizing ratio (a high efficiency factor).

FIG. 1 is a cross section diagram of a floating-clamp-body-type high-energizing single-side double-inclined-surface disc brake for a car and an electric car.

Now according to FIG. 1, the structure and working principle of the brake will be introduced as follows. A brake disc (3) of the invention is completely the same as that of the common brake disc in the prior art. A brake shoe (2) is basically the same as the common brake shoe (also known as a brake sheet). Two brake shoes (2) are provided at the two sides of the brake disc (3). The brake disc (3) is secured to a wheel and can be rotated with the wheel. A machine body (1) is attached to a bracket (4) with a sliding way. The bracket (4) is fixed on a component which supports the wheel. One of the two brake shoes (2) is mounted at the left side of the machine body (1) and also slidably attached to the bracket (4). This is the same as the common brake. The other brake shoe is fixedly mounted on an energizing inclined board (5); a self-energizing inclined surface (19) on the energizing inclined board (5) is slidably abutted against the self-energizing inclined surface (19) and driven by the self-energizing inclined surface (19) on a control inclined board (7); the another two control inclined surfaces (18) on the control inclined board (7) are abutted against two control inclined surfaces (18) on a compensation board (8) in a moveable way; the upper and lower ends of the compensation board (8) are abutted against the bracket (4) in a moveable way; the other surface of the compensation board is connected to two compensation screws (15) via two steel balls (17); the two compensation screws (15) are connected with the machine body (1) via a thread connection; two torsional springs (11) are connected with the two compensation screws (15) and the machine body and provide torsion to the two compensation screws (15); a friction limiting shaft (10) is slidably connected with the energizing inclined board (5), the compensation board (8) and the machine body (1); a thread hole on an inclined surface shaft (14) is in a thread connection with a shaft on a motor (13); an inclined surface (20) on the inclined shaft (14) is slidably connected with the inclined surface (20) on the control inclined board (7).

The working principle of the brake is as follows: when a car is moving forwards, the brake disc (3) is rotated from down to up (V direction). When the car needs braking, the operator steps on the brake pedal to control the rotation of the motor (13); after the motor (13) is rotated, the thread on the main shaft of the motor makes the inclined surface shaft (14) move toward the left; the inclined surface shaft (14) is slidably attached to the machine body with a key, and the inclined surface (20) on the inclined surface shaft (14) pushes the control inclined board (7) and the energizing inclined board (5) to move towards the left and upwards; after the brake shoe (2) anchored on the energizing inclined board (5) contacts the brake disc (1), the control inclined surface (18) on the control inclined board (7) further pushes the compensation board (18), and then pushes the machine body (1) to the right through the steel ball (17) and the compensation screw (15); the machine body (1) then pushes the other brake shoe (2) to the right until the brake shoe (2) contacts the brake disc (3); when the two brake shoes (2) contact the brake disc (3), the friction force (braking force) produced by the brake shoe (2) fixed on the energizing inclined board (5)—and the brake disc (3) pushes the energizing inclined board (5) upwardly or makes the energizing inclined board (5) have a trend of upward movement; then the energizing inclined board (5), under the action of the energizing inclined surface (19) on the control inclined board (7), increases the pressure toward the left, and at the same time also increases the stress on the machine body (1), such that the other brake shoe (the brake shoe at the left) is also applied with the same increased pressure. This is the working principle of the brake that uses the energy of a vehicle during its travel. However, if the friction force (the braking force) produces a huge accumulative self-energizing action and the control inclined surface (18) moves downwards under the pressure of the energizing inclined board (5) and the compensation board (8), the energizing ratio (efficiency factor) of the self-energizing brake will be very small. If a retaining device is provided between the control inclined board and a control device, i.e. output movement or force from the control device to the brake, its efficiency will be relatively high. However, when the control inclined board is reversely applied on the control device, its efficiency will be very low, such that the force of the control inclined board reversely applied on the control device will be very small. Accordingly, the control device can control the brake with a very low force and power, leading to a high self-energizing ratio (efficiency factor) of the self-energizing disc brake. As shown in FIG. 1, two retaining devices are connected in series, one of which is an inclined surface (20) on the control inclined board (7) and the inclined surface (20) on the inclined surface shaft (14), and the other one is the thread hole on the inclined surface shaft (14) and the outer thread on a main shaft of the motor (13). When inputting motion and force to the control inclined board (7), they could contribute to have a high efficiency. However, when they are rotated reversely, their efficiency will be very low because of the friction force. Therefore, the brake can be well controlled without applying much force. The energy of the vehicle during its travel can be used to energize the brake. In theory, the energizing ratio (efficiency factor) of the invention can be increased by one times or even dozens of times. Therefore, the disc brake can be well controlled by small control force. In particular, the electronic control (EMB) of a brake system of a car can be achieved by this way. It is many times bigger than the self-energizing ratio (efficiency factor) of a drum brake. However, most of the disc brake in the prior art does not have the self-energizing effect.

FIG. 1 shows an automatic compensation device of the disc brake, which consists of the compensation board (8), the friction limiting shaft (10), the compensation screw (15) and the torsional spring (11). Such manner for compensation can be found in other brakes.

Figure 2:
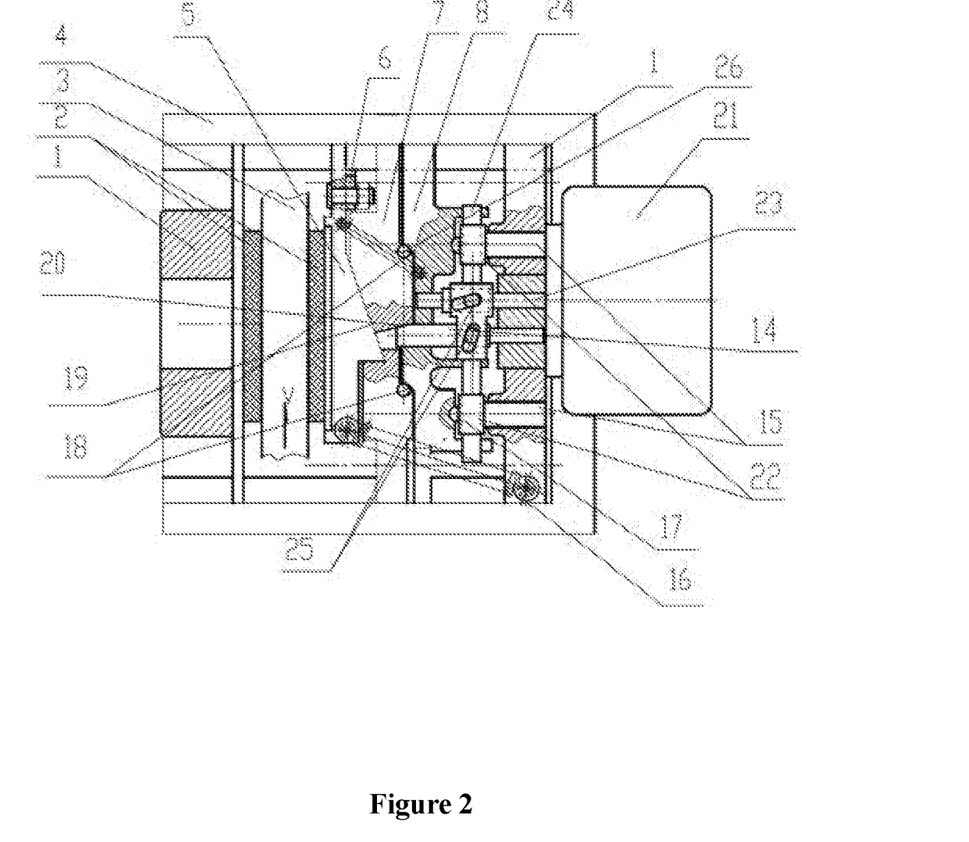
FIG. 2 is a cross section diagram of a float-caliper double-inclined-surface disc brake actuated by an electromagnet according to one embodiment of the present invention. The brake uses three retaining devices connected in series so that the power (i.e., a control force) of the electromagnet can be very low. An automatic compensation device of the brake is the same as that of a pneumatic disc brake of a truck or a passenger bus.

FIG. 2 is a diagram showing one solution using an electromagnet as a power source. When an electric pushing rod of the electromagnet (21) moves to the left, a pin (25) on the rod (23) pushes an inclined groove rod (24) upwardly; an inclined groove on the inclined groove rod (24) pushes the pin (25) and the inclined surface shaft (14) to the left, and the inclined surface shaft (14) pushes the control inclined board (7) upwardly and pushes the energizing inclined board (5) to the left; the movement of the energizing inclined board (5) and the control inclined board (7) push the brake shoe (2) to abut against a right surface of the brake disc (3). After that, the machine body (1) moves to the right, wherein the clamp jaw of the machine body pushes the brake shoe (2), which is located at the left side of the brake disc (3), to the right. At last, the brake shoe (2) will be pressed on a left surface of the brake disc (3). When both the brake shoes (2) are pressed on the surface of the brake disc (3), the brake shoe (2) which is provided on the energizing inclined board (5) still has the upwardly-move trend under the brake friction force, and renders the energizing inclined board (5) to have a upwardly-move trend at the same time under the self-energizing inclined surface (19). At this time, the two brake shoes will get more pressure. Furthermore, the machine body (1) also applies more pressure to the brake shoe (2) at the left side of the brake disc (3). By this way, the self-energizing effect can be achieved. According to the present solution, three groups of retaining devices are provided, which is consisted of the inclined groove on the inclined surface (20) and the inclined groove rod (24), the pin (25), the inclined surface shaft (14) and the rod (23). The reverse efficiency of each group can be designed to be not very low, so that they can reliably return and release the braking when the braking is released, whereas the product of the reverse efficiency of the three groups remains low level. Accordingly, the self-energizing ratio (efficiency factor) of the brake can be very high, and the control force (or the power) controlling the brake can be very low, thereby making the brake easy to be controlled and greatly expands the control manner to the brake.

The automatic compensation device of a brake shown in FIG. 2 is substantially the same as the automatic compensation device of trucks or passager buses in structure. The brake is powered by the electromagnet, wherein a gear belt is provided on the inclined groove rod (24) of the brake, and the gear belt drives a limiting overrunning clutch (22) that is mounted on the screw (15). The gear belt will not drive the screw (15) until a certain space therebetween is eliminated. After the screw (15) stops rotating, the overrunning clutch (22) cannot drive the rotation of the screw (15) as it has excessive power. However, the brake can continue increasing the braking force for braking. When the inclined groove rod (24) is returned, the limiting overrunning clutch (22) will overrun and therefore cannot drive the screw (15) to rotate backwards. The brake carries out automatic compensation for one time. The compensation is not carried out each time, but only when the space between the brake shoe (2) and the brake disc (3) is large enough.

In addition to be driven by electric power or manpower, the control device of the brake can also be driven by a hydraulic power or a pneumatic power. Most of means that can output motion and force may be adopted as the control device.

Figure 3:
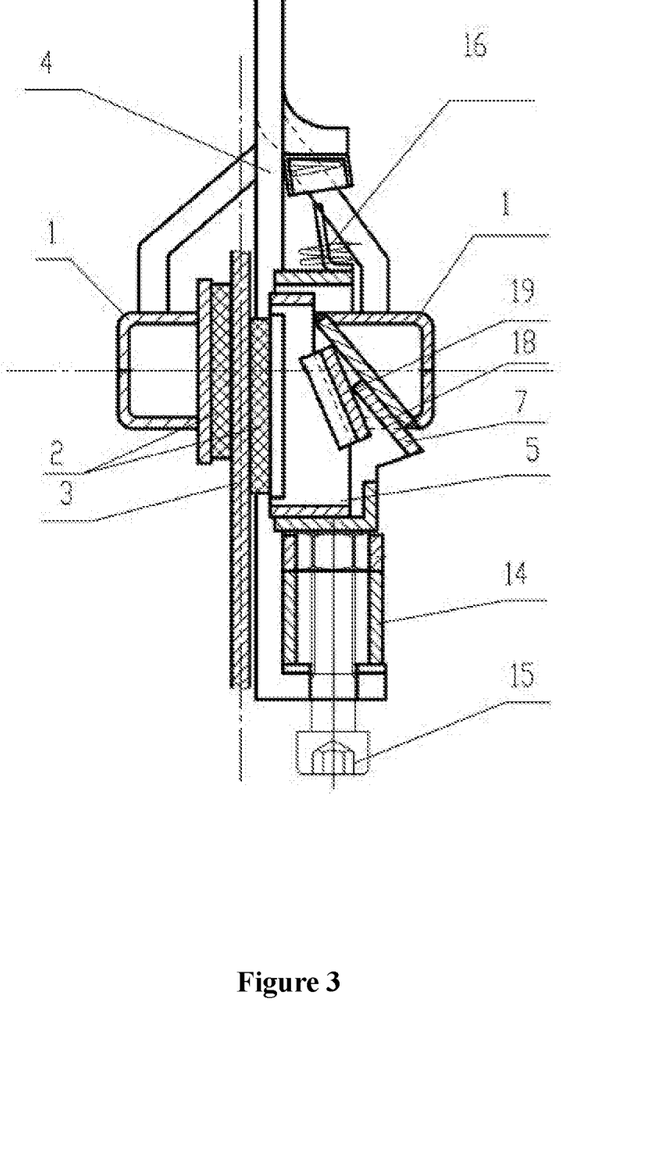
FIG. 3 is a cross section diagram of a single-side double-inclined-surface disc brake used in motorcycles according to one embodiment of the present invention. The brake is driven by a handle manually.

Referring to FIG. 3, a cross section diagram of the single-side double-inclined surface disc brake used in motorcycles is provided. The machine body (1) is attached to the bracket (4). Another side of the first brake shoe (2) (located on the left side of the brake disc (3) in FIG. 3) is attached to the machine body (1). The second brake shoe (2) (located on the right side of the brake disc in FIG. 3) is mounted on the energizing inclined board (5). A first self-energizing inclined surface (19) on the energizing inclined board (5) is abutted to a second self-energizing inclined surface (19) which is located on the control inclined board (7). The control inclined surface (18) on the control inclined board (7) is abutted to another control inclined surface (18) that is disposed on the compensation board (8). The brake disc (5) is attached to the wheel of a motorcycle. The bracket (4) is secured to a front fork of the motorcycle. The energizing inclined board (5) is abutted against the second brake shoe (2). (As shown in FIG. 3, the energizing inclined board is secured to the second brake shoe). The control inclined board (7) is mounted onto the energizing board (5) and being slide fit with the energizing inclined board.

Figure 4:
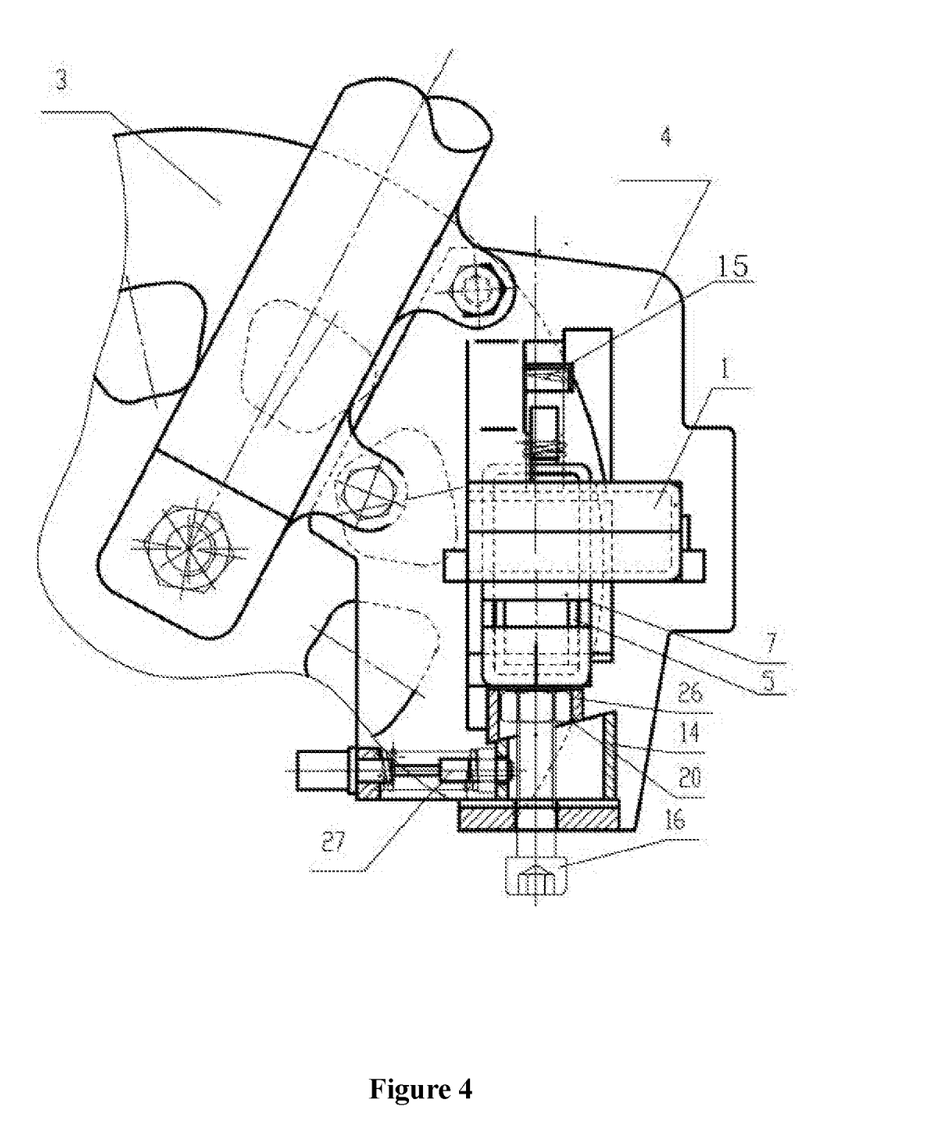
FIG. 4 is another diagram of the single-side double-inclined-surface disc brake of FIG. 3 according to one embodiment of the present invention, the brake does not use an automatic compensation mechanism.

Referring to FIG. 4, which is another diagram of the brake of FIG. 3 according to one embodiment of the present invention. As can be seen therefrom, the auto compensation mechanism is not used in FIG. 4. The brake is controlled by a handle drawing a steel wire rope (27). The brake is a single-side double-inclined-surface disc brake used in motorcycles which is different than the brake of FIG. 5.

Figure 5:
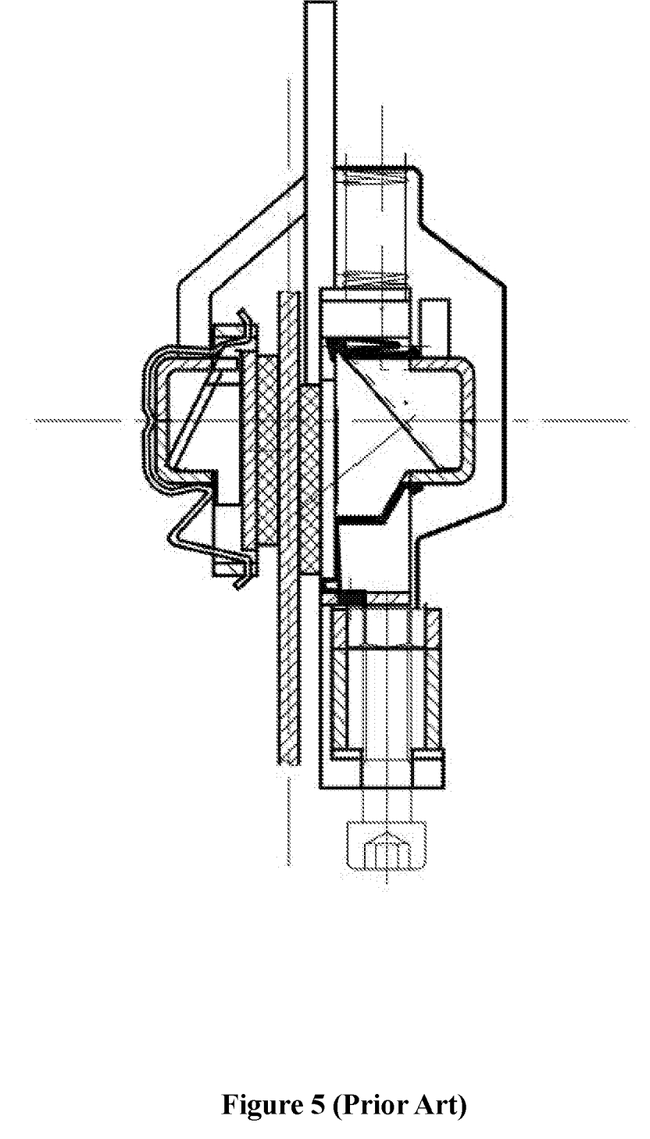
FIG. 5 is a diagram of a motorcycle used self-energizing disc brake in the prior art.
Figure 6:
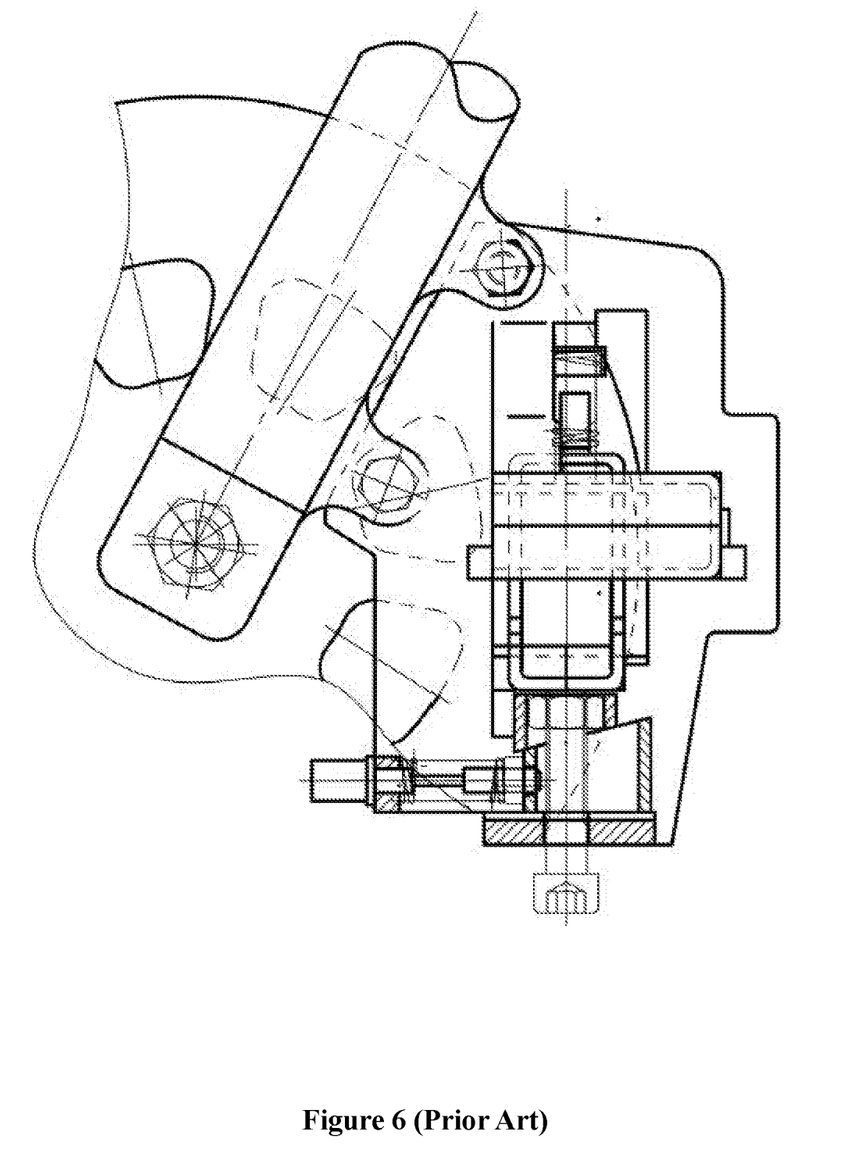
FIG. 6 is another diagram of a motorcycle used self-energizing disc brake of FIG. 5.

FIGS. 5 and 6 are motorcycle used self-energizing disc brakes in the prior art. As shown in the figures, inclined surfaces are provided at the two sides of the brake, one of which is an energizing surface, and the other one is a control inclined surface. The automatic compensation device is not needed any more.

With respect to a working surface of the brake disc (3), generally, the angle of a working inclined surface (19) of the energizing inclined board (5) is smaller than that of the control inclined board (7). At this time, if the retaining device is provided again, a miracle appears. Such brake has the features of being easier to be separated and relative small dragging resistance after separation, and also has the advantage of big energizing effect. The brake of the invention contains the advantages at the same time.

The brake also compensates for the deformation that is produced by the machine body (1) during braking. Since the brake can compensate for the deformation of the machine body (1), the working stroke of the control device can be reduced. The energizing effect of the invention can be quite large without increasing the operation stroke and working pressure. Under the same condition in an operation stroke, the brake of the invention can produce the braking force several times—dozens times more than the braking force of the common disc brake.

The single-side double-inclined-surface disc brake can be provided with an automatic compensation mechanism, wherein many types of automatic compensation mechanism can be used. The automatic compensation mechanism is alternative when the needed braking force is small; however, when the needed braking force is large enough, the automatic compensation mechanism may be necessary to provide a better performance. The automatic compensation screw can also be driven by other parts.

In addition, the brake can also use the automatic compensation mechanism which is commonly used in the disc brake of trucks in prior art. The automatic compensation mechanism used in the prior art has a compensation screw, too. The power of the brake comes from a rocker arm, and the rocker arm drives a torsional-limit non-step square-shaped torsional-spring-type overrunning clutch and then the screw. Such compensation method is commonly used in a pneumatic disc brake.

In addition, it is difficult to provide a parking brake in the common disc brake and it also takes lots of cost. However, it is very easy to additionally provide the parking brake in the disc brake of the invention without increasing any manufacturing cost. The working principle is as follows: one steel wire rope of a hand brake is directly provided on the energizing inclined board (5); when the hand brake is pulled, the hand brake pulls the steel wire rope and then the energizing inclined board (5) to move upwardly; under the wedge-caulking action of the energizing inclined board (5) and the control inclined board (7), the two brake sheets (2) clamp the brake disc (3) to carry out parking and emergent braking. Of course, other ways can also be used to carry out parking and braking.

In order to quickly eliminate the gap and meet the needs of braking, several working inclined surfaces of the brake can be curved, such as a circular arc surface, a hyperbolic surface, a parabolic surface, and etc. Each curved surface can also be combined by several inclined surfaces or several curved surfaces or the combination thereof.

To improve the efficiency of the brake; and increase the braking force and facilitate the return of the brake, a rolling body, preferably a rolling needle or a cylindrical roller, can be mounted between the main working surfaces or between the inclined surfaces.

The present invention can be used for a car, a truck, a motorcycle, a bicycle, an elevator and other machines in traffic and transportation fields which need brakes. The brake of the invention can be easily controlled and provide big braking force. Particularly, with the brake of the invention, a safer car brake system (EMB) can be developed. Said brake can completely be controlled electrically and provide higher security with low cost.

The invention claimed is:

1. A disc brake, comprising
   a brake disc,
   a machine body movably connected to a frame,
   two brake shoes, one of which is mounted onto the machine body and the other is positioned at one side of the brake disc;
   a drive device and a compensation device;
   wherein the brake shoe positioned at one side of the brake disc is mounted onto one side of an energizing inclined board; a first self-energizing inclined surface on the other side of the energizing inclined board is abutted against a second self-energizing inclined surface on one side of a control inclined board, such that the energizing board is driven by the control inclined board;
   wherein the control inclined board further comprises a first control inclined surface and a second control inclined surface on the other side opposite to the second self-energizing inclined surface of the control inclined board;
   wherein the compensation device comprises a compensation board having a first compensation inclined surface and a second compensation inclined surface;
   wherein the first control inclined surface is abutted against the first compensation inclined surface and the second control inclined surface is abutted against the second compensation inclined surface;
   the control inclined board is further abutted against a retaining device; the retaining device is connected with a control device.

2. The brake according to claim 1, wherein the retaining device is selected from the group consisting of means, mechanisms, devices, or components with high frontward transmission efficiency and low backward transmission efficiency
   wherein one or more retaining devices are used;
   wherein the control device comprises a handle, a hydraulic system, an electrical system, a motor and a pneumatic system.

3. The brake according to claim 2, wherein: the retaining device is selected from the group consisting of threads, inclined surfaces, cams, worm-and-gear, connecting rods and wedges.

4. The brake according to claim 1, wherein the first self-energizing inclined surface, the second-energizing inclined surface, the first control inclined surface, the second control inclined surface, the first compensation inclined surface and the second compensation inclined surface each comprises a configuration selected from the group consisting of arc, a hyperbolic curve and parabola;
   wherein the first and second self-energizing inclined surfaces, the first and second control inclined surfaces, the first and second compensation inclined surfaces each is formed by a plurality of sub-inclined surfaces, a plurality of curved surfaces, or the combination thereof.

5. The break according to claim 4, wherein: a rolling body provided between the first self-energizing inclined surface and the second self-energizing inclined surface between the first control inclined surface and the first compensation inclined surface, or between the second control inclined surface and the second compensation inclined surface is selected from the group consisting of a rolling needle, a cylindrical roller or a steel ball.

6. The break according to claim 1, wherein one side of the compensation board is moveably connected to the frame, and the other side of the compensation board is connected to two compensation screws by means of the rolling body;
   wherein the two compensation screws are engaged with the machine body with a threaded connection;
   wherein two torsional springs are connected to the two compensation screws and the machine body and therefore provide torsion for the two compensation screws;
   wherein a friction limiting shaft is movably connected to the energizing inclined board, the compensation board and the machine body;
   wherein a thread hold provided on an inclined surface shaft is engaged with a shaft on the motor;
   wherein a inclined surface on the inclined surface shaft is movably connected to the control inclined board.

* * * * *